United States Patent
Tseng

(10) Patent No.: US 7,515,314 B2
(45) Date of Patent: Apr. 7, 2009

(54) METHOD FOR CORRECTING NEGATIVE FILM IMAGES

(76) Inventor: Wen-Chao Tseng, No. 56, MingChu St., WuFang Hsiang, TaiChung (TW)

( * ) Notice: Subject to any disclaimer, the term of this patent is extended or adjusted under 35 U.S.C. 154(b) by 689 days.

(21) Appl. No.: 10/281,553

(22) Filed: Oct. 28, 2002

(65) Prior Publication Data

US 2004/0080793 A1 Apr. 29, 2004

(51) Int. Cl.
*H04N 1/04* (2006.01)

(52) U.S. Cl. .................. 358/474; 358/487; 358/506; 382/199; 382/274; 348/345; 348/223.1; 396/311; 396/60

(58) Field of Classification Search ............... 358/474, 358/487, 486, 501, 505, 506, 527, 538, 488; 382/282, 173, 453, 199, 274; 348/345, 223.1; 396/60, 311

See application file for complete search history.

(56) References Cited

U.S. PATENT DOCUMENTS

| 5,157,482 | A  | * | 10/1992 | Cosgrove | 348/97 |
| 5,414,779 | A  | * | 5/1995 | Mitch | 382/199 |
| 5,596,415 | A  | * | 1/1997 | Cosgrove et al. | 358/296 |
| 6,195,474 | B1 | * | 2/2001 | Snyder et al. | 382/312 |
| 6,236,467 | B1 | * | 5/2001 | Yamamoto | 358/442 |
| 6,766,065 | B1 | * | 7/2004 | Yamamoto | 382/282 |
| 6,864,973 | B2 | * | 3/2005 | Young et al. | 356/239.2 |
| 6,900,911 | B1 | * | 5/2005 | Yamazaki | 358/3.26 |
| 2001/0012136 | A1 | * | 8/2001 | Kurosawa | 358/487 |
| 2003/0081274 | A1 | * | 5/2003 | Yamamoto | 358/504 |

* cited by examiner

*Primary Examiner*—Negussie Worku
(74) *Attorney, Agent, or Firm*—Stolowitz Ford Cowger LLP

(57) ABSTRACT

A correction scheme derives correction parameters from an interval between image data in a negative film. In one embodiment, a scanner uses the correction parameters to correct image data scanning.

16 Claims, 4 Drawing Sheets

METHOD FOR CORRECTING NEGATIVE FILM IMAGES

FIELD

The claimed subject matter relates to correcting negative film images.

BACKGROUND

Computers have penetrated into each family and enterprise to become an indispensable electronic product in our modern daily lives. Accessory products, such as, scanners have become important input devices for computers. For example, scanners are widely used as a computer accessory device in the production of professional web pages.

Scanners may be used to scan paper documents as well as positive and negative film. Both the positive film and negative film comprise transparent materials. Specifically, the positive film is a lantern slide that keeps original color data during scanning development. The negative film has a color with a contrast color transition (such as: black changes to white, and red changes to green).

Characteristics of the negative film vary according to factors including age of the film and manner of storage. These varying characteristics make negative film scanning difficult. The scanner may therefore need to correct the negative film image.

FIG. 1 describes a hardware correction scheme where a correction film 2 having an age close to that of the negative film 1 is directly pasted adhesively onto the front side of the negative film 1 to be scanned. The interior of the negative film 1 has plural image data 3. During pre-scanning by a scanner, correction parameter values are obtained from the correction film 2. During scanning, the scanner scans and corrects the negative film 1 image data according to the correction parameter values obtained from the correction film 2.

However, shortcomings still exist.

SUMMARY OF THE INVENTION

A correction scheme derives correction parameters from a negative film interval. In one embodiment, a scanner uses the correction parameters to correct image data scanning.

DETAILED DESCRIPTION

In order to further understand the claimed subject matter, several attached drawings, detailed structure of the claimed subject matter, and its connection relationship are presented as follows.

Figure 1:
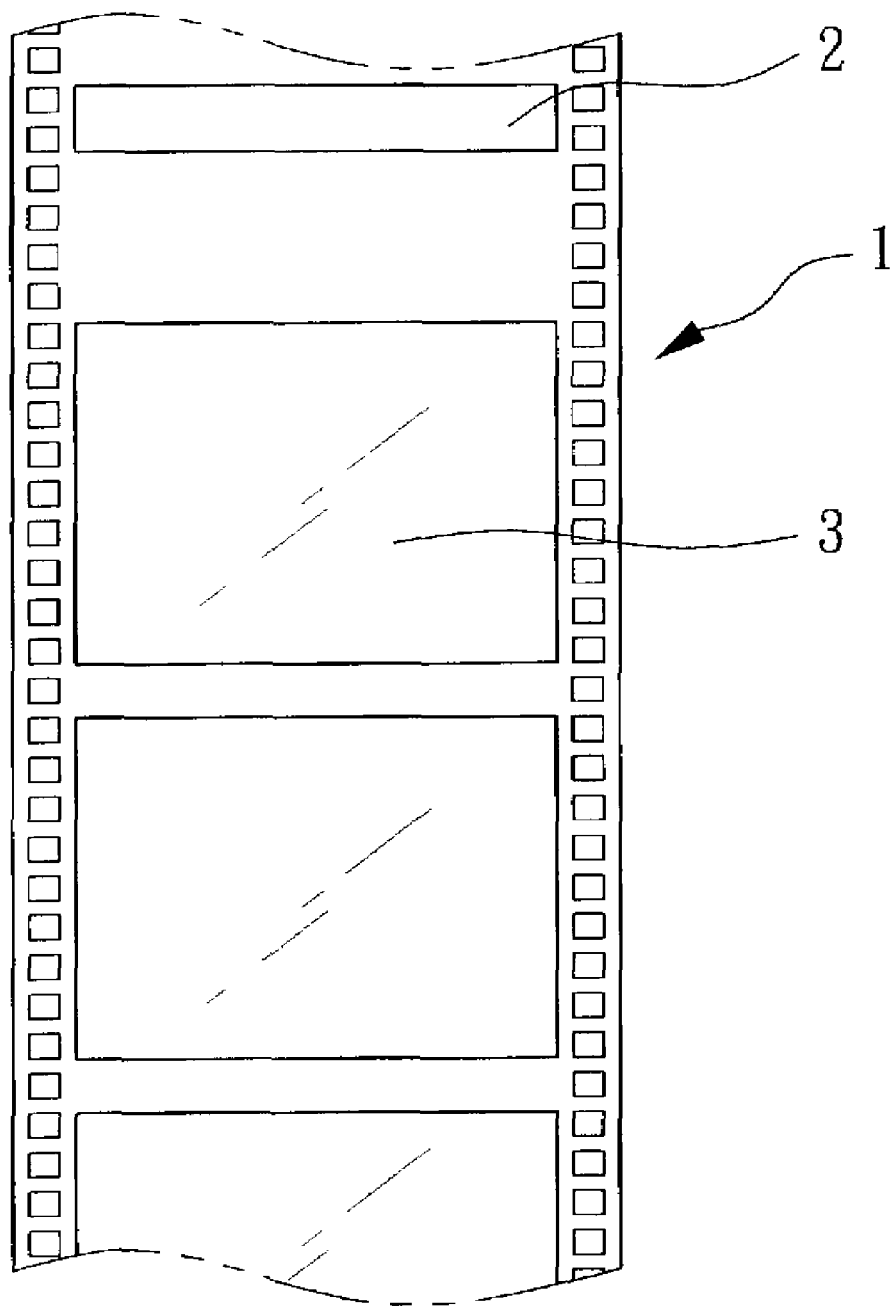
FIG. 1 is a diagram showing how a correction film is used to obtain scanning parameters.
Figure 2:
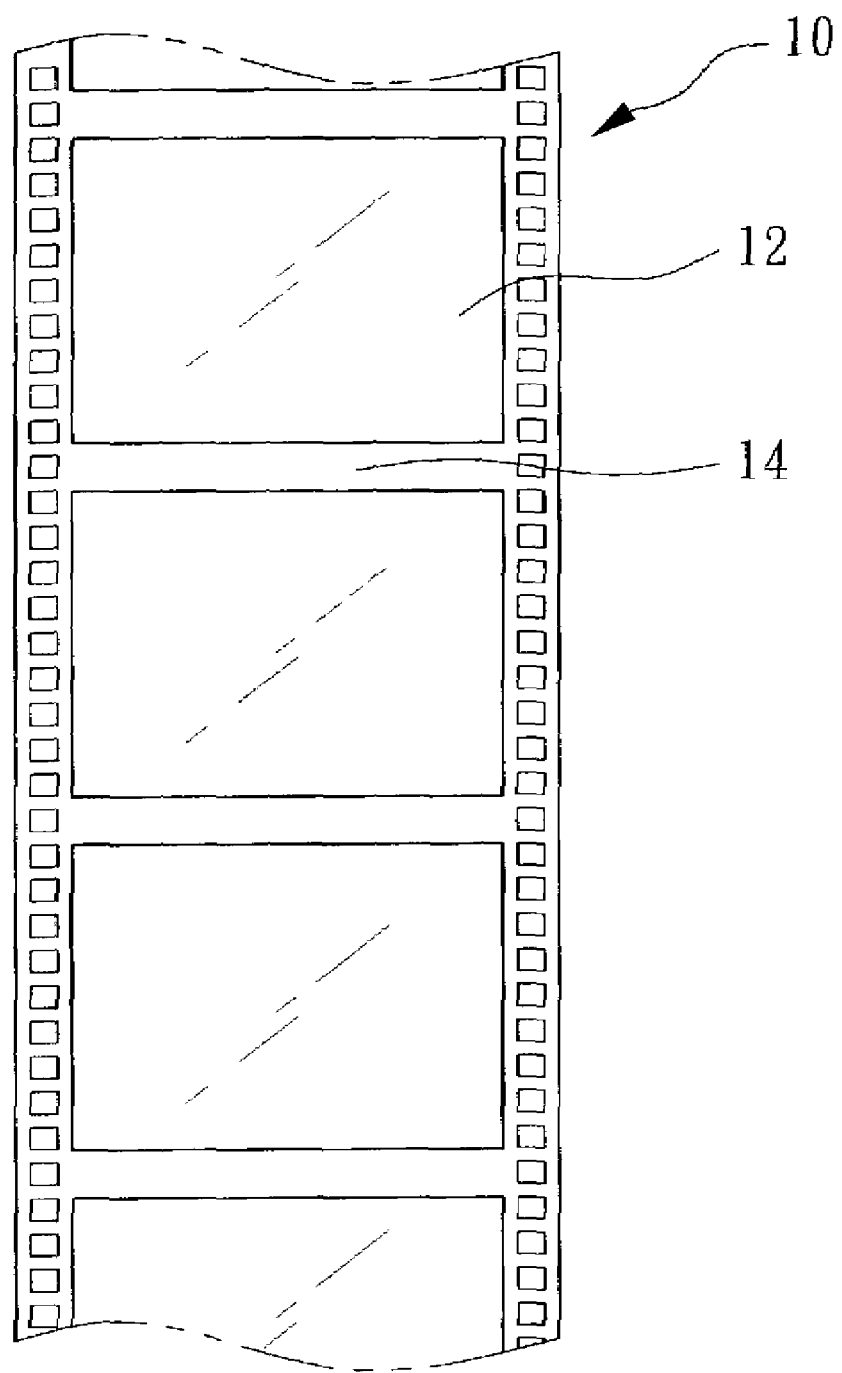
FIG. 2 is a diagram showing a negative film scanning object.

FIG. 2 shows how a negative film 10 is used as a scanning object, wherein the negative film 10 may comprise a negative used in common photography. The negative film 10 is exposed to an image. The captured image is stored as image data in image data zone 12.

An interval zone 14 not containing image data may be located between two image data zones 12. Characteristics of the interval zone 14 are not easily varied or influenced by time and other factors. In certain conditions, correction parameters obtained from the interval zone 14 as used reading and correcting the image data 12.

The following describes the correction operation in more detail.

(1) The negative film 10 is pre-scanned to obtain all of image data.

(2) All of the image data is used to determine a division between the image data of the negative film and the interval zone of the negative film. The length, width and position of the interval zone is obtained.

(3) A determination is made whether the negative film has an interval zone. If there is an interval zone, the correction scheme proceeds to operation (4). If there is no interval zone, the correction scheme proceeds to operation (5).

(4) A determination is made whether the image data is after the interval zone. If yes, the scheme executes operation (6). If no, the scheme executes operation (7).

(5) If the negative film does not have an interval zone, a correction to the image data is made according to a hardware correction mode. The scheme then proceeds to operation 8.

(6) When the image data is after the interval zone, the correction scheme moves to the interval zone and obtains interval zone correction parameters. The correction parameters are then used to read and correct the image data.

(7) When the image data is not after the interval zone, the image data and the interval zone are scanned together. The scanner software reads the interval zone for then correcting the image data. The scheme then executes operation (9).

(8) The scanner formally scans the image data after any corrections are made.

(9) The scanning process then ends.

Figure 3:
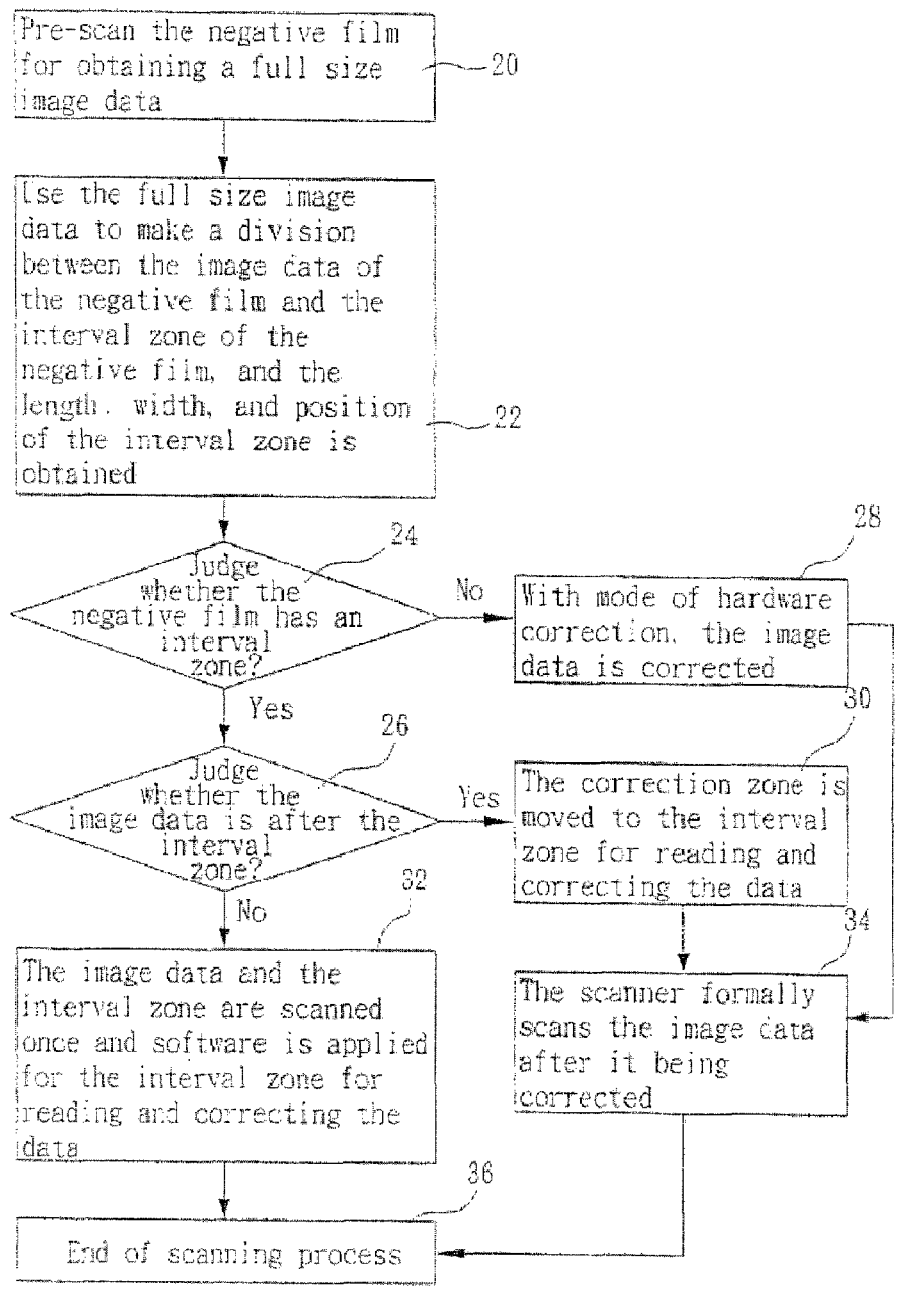
FIG. 3 is a block diagram showing how a scanner, computer, and its software perform image correction of negative film.

FIG. 3 is a block diagram describing in more detail how a scanner, a computer, and/or computer or scanner software may provide image correction for negative film.

The negative film is placed in the scanner and, with the aid of appropriate software, the image data of the negative film may be corrected as follows.

In operation 20, the negative film may be pre-scanned to obtain a full size film image that includes all of the image data.

In operation 22, the full size image data is used to identify the image data on the negative film and the interval zones on the negative film. Interval zone information, such as the length, width and position of the interval zone is obtained.

Operation 24 determines whether the negative film has an interval zone. If the negative film has an interval zone, a determination is made in operation 26 whether the image data is before or after the interval zone.

If the negative film does not have an interval zone in operation 24, a correction is made to the image data in operation 28 using a hardware correction mode. For example, an existing pre-scan scheme described in the background uses a correction film attached to the negative film to correct the image data.

When an interval zone is detected in operation 24 and the image data follows the interval zone in operation 26, the scanner or computer moves to the interval zone in operation 30. The interval zone is then read and the derived interval zone parameters are then used to correct the image data.

When the image data is in front of the interval zone in operation 26, the image data and the interval zone are scanned together in operation 32 and software is applied to the interval zone for reading and correcting the image data.

In operation 34 the scanner formally scans the image data after being corrected either with the derived interval zone correction parameters or using the hardware mode. The scanning process then ends in operation 36.

Figure 4:
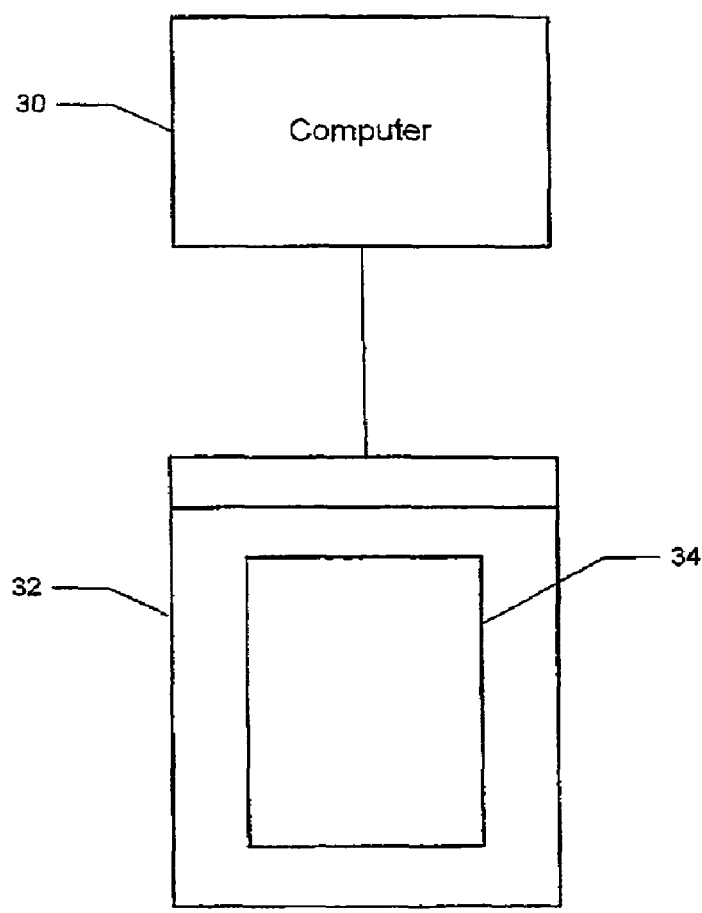
FIG. 4 is a block diagram of a scanner and a computer employing software to provide image correction of negative film.

Referring to FIG. 4, there is illustrated a computer 40, coupled to a scanner 42. The computer 40 may employ the scanner 42, a film 44 disposed on the scanner and appropriate software (not shown) such as correction software to perform one or more of the embodiments disclosed herein.

Through the above process, the image of a common negative film can be effectively corrected. By placing negative film in the scanner and with the aid of appropriate software, the image data of the negative film may be corrected, such that an accurate and clear image may be obtained when the scanner is scanning.

What is claimed is:

1. A method for correcting a film image, comprising:
   pre-scanning a film to obtain the film image;
   determining at least one characteristic of the film image;
   identifying one or more image data zones in the film image that contain image data and determining if at least one interval zone exists in the film image in-between the image data zones that does not contain the image data;
   determining at least one characteristic of an identified interval zone;
   comparing the at least one characteristic of the film image with the at least one characteristic of the identified interval zone data and using the identified interval zone as a correction zone for deriving correction parameters for correcting the image data; and
   scanning the film in accordance with the correction parameters derived from the identified interval zone, the correction parameters derived from the interval zone used during the scanning to read and correct the image data.

2. The method of claim 1, wherein the film comprises negative film.

3. The method of claim 1, wherein the correction parameters are used to correct clarity of the image data.

4. The method of claim 1 further comprising using the identified interval zone to correct the image data when the interval zone is identified between the image data zones.

5. A method for correcting a film image, comprising:
   pre-scanning a film to obtain the film image;
   identifying one or more image data zones in the film image that contain image data and determining if at least one interval zone exists in the film image in-between the image data zones that does not contain the image data;
   using the identified interval zone as a correction zone for deriving correction parameters for correcting the image data;
   scanning the film in accordance with the correction parameters derived from the identified interval zone, the correction parameters derived from the interval zone and used during the scanning to read and correct the image data;
   using a hardware correction mode to correct the image data when the interval zone is not identified, the hardware correction mode using a second attached correction film as the correction zone for generating the correction parameters; and
   using the identified interval zone to correct the image data when the interval zone is identified between the image data zones.

6. The method of claim 1 further comprising:
   determining a position of the identified interval zone before or after associated image data;
   moving a correction zone for generating the correction parameters to the identified interval zone when the image data zone is before the associated image data;
   using the correction parameters from the interval zone for reading and correcting the associated image data and then scanning the corrected image data;
   scanning both the interval zone and the associated image data together when the interval zone is located after the associated image data; and
   generating the correction parameters from the already scanned interval zone and then applying the correction parameters to the already scanned associated image data.

7. A method for correcting a film image, comprising:
   pre-scanning a film to obtain the film image;
   identifying one or more image data zones in the film image that contain image data and determining if at least one interval zone exists in the film image in-between the image data zones that does not contain the image data;
   using the film image to identify and distinguish between the image data zones and the interval zone in the film;
   using an identified interval zone as a correction zone for deriving correction parameters for correcting the image data;
   scanning the film in accordance with the correction parameters derived from the identified interval zone, the correction parameters derived from the interval zone used during the scanning to read and correct the image data;
   using hardware correction to correct the image data and re-scanning the image data according to the hardware correction when the film image is determined not to have the interval zone;
   determining whether the image data is in front or in back of the interval zone when the interval zone is identified in the film image;
   using the interval zone to determine the correction parameters for correcting the image data and then re-scanning the image data according to the correction parameters determined from the interval zone when the image data is determined to be located in back of the interval zone; and
   scanning the image data and the interval zone and then using software to obtain the correction parameters from the scanned interval zone when the image data is determined to be located in front of the interval zone and then using the correction parameters obtained from the interval zone to correct the image data without re-scanning the image data.

8. A computer-readable storage medium encoded with computer-executable instructions, that, if executed, result in:
   pre-scanning a film to obtain the film image;
   identifying image data of the film image and non-image interval zone data of the film image, the non-image interval zone data being located between image data zones that contain the image data;
   forming correction parameters for the image data from the non-image interval zone data;
   scanning the film in accordance with the correction parameters to obtain a corrected film image;
   determining at least one characteristic of the film image;
   determining at least one characteristic of the non-image interval zone data; and comparing the at least one characteristic of the film image and the at least one characteristic of the non-image interval zone data.

9. The computer-readable storage medium according to claim 8 wherein the computer-executable instructions, if executed, further result in:
scanning the film to obtain the film image; and
altering at least a portion of the film image based on, at least in part, the correction parameters.

10. An apparatus comprising:
a scanner configured to:
pre-scan a film to obtain a film image;
identifying image data of the film image and determine at least one characteristic of the film image;
identify interval zone data, if any, of the film image and determine at least one characteristic of the interval zone data;
compare the at least one characteristic of the film image and the at least one characteristic of the interval zone data;
form correction parameters for the image data based, at least in part, on the interval zone data, when the interval zone data is identified in the film image; and
scan the film in accordance with the correction parameters to obtain a corrected film image.

11. The apparatus of claim 10, wherein the film comprises negative film.

12. The apparatus of claim 10, wherein the film comprises photographic film.

13. The apparatus of claim 10, wherein the film comprises at least one image data zone containing the image data and at least one imageless interval zone located adjacent to the at least one image data zone and the scanner uses correction parameters obtained from an imageless interval zone to read and correct the image data.

14. The apparatus of claim 13, wherein the scanner is further adapted to:
identify a location of the imageless interval zone either before or after the image data zone;
move to the imageless interval zone to obtain the correction parameters prior to performing a final scan on the image data when the imageless interval zone is before the image data; and
perform a final scan of both the image data and the imageless interval zone when the imageless interval zone is after the image data and then use software to obtain the correction parameters from the scanned imageless interval zone for reading and correcting the scanned image data.

15. The apparatus of claim 10, wherein the scanner is further adapted to obtain a corrected film image by:
scanning the film to obtain the film image; and
employing the correction parameters to alter at least a portion of the film image.

16. An apparatus comprising:
a scanner configured to:
pre-scan a film to obtain a film image;
identify image data of the film image and interval zone data, if any, of the film image;
form correction parameters for the image data based, at least in part, on the interval zone data, when the interval zone data is identified in the film image;
form the correction parameters for the image with a hardware correction mode when the interval zone data is not identified in the film image;
scan the film in accordance with the correction parameters to obtain a corrected film image, wherein the film comprises at least one image data zone containing image data and at least one imageless interval zone located adjacent to the at least one image and the scanner uses correction parameters obtained from the imageless interval zone to read and correct the image data;
determine whether the image data zone is located in front or in back of the interval zone when the interval zone is identified;
using the interval zone data to obtain the correction parameters for correcting the image data and then re-scanning the image data according to the correction parameters obtained from the interval zone data when the image data zone is determined to be located after the interval zone; and
scanning the image data and the interval zone data at the same time and then using software to obtain the correction parameters from the scanned interval zone data when the image data zone is determined to be located in front of the interval zone data and then using the correction parameters obtained from the interval zone data to correct the image data without re-scanning the image data zone and interval zone data.

* * * * *

UNITED STATES PATENT AND TRADEMARK OFFICE
CERTIFICATE OF CORRECTION

PATENT NO. : 7,515,314 B2
APPLICATION NO. : 10/281553
DATED : April 7, 2009
INVENTOR(S) : Wen-Chao Tseng It is certified that error appears in the above-identified patent and that said Letters Patent is hereby corrected as shown below:

Column 4, line 56 (Claim 8):   Delete "the" and insert -- a --, therefor; and

Column 5, line 13 (Claim 10):   Delete "identifying" and insert -- identify --.

Signed and Sealed this
Twenty-second Day of March, 2011

David J. Kappos
*Director of the United States Patent and Trademark Office*